United States Patent
Walters et al.

(10) Patent No.: US 9,520,645 B2
(45) Date of Patent: Dec. 13, 2016

(54) ELECTRONIC DEVICE WITH ELECTROMAGNETIC SHIELDING STRUCTURES

(71) Applicant: Apple Inc., Cupertino, CA (US)

(72) Inventors: Derek J. Walters, Campbell, CA (US); Michael Eng, San Jose, CA (US); Brian S. Tryon, Los Gatos, CA (US); Connor R. Duke, Sunnyvale, CA (US); Kieran Poulain, San Francisco, CA (US); Nicholas J. Kunst, San Francisco, CA (US); Shaohai Chen, Cupertino, CA (US); Shaoqing Xiang, Sunnyvale, CA (US); Sung Woo Yoo, Santa Clara, CA (US); Chun Cheng Teo, Mountain View, CA (US); Paul Nangeroni, Mountain View, CA (US); Eric Steven Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 14/262,574

(22) Filed: Apr. 25, 2014

(65) Prior Publication Data

US 2015/0070236 A1 Mar. 12, 2015

Related U.S. Application Data

(60) Provisional application No. 61/875,552, filed on Sep. 9, 2013.

(51) Int. Cl.
*H01Q 19/09* (2006.01)
*H01Q 1/52* (2006.01)
(Continued)

(52) U.S. Cl.
CPC .............. *H01Q 1/526* (2013.01); *H01Q 1/243* (2013.01); *H04B 15/00* (2013.01)

(58) Field of Classification Search
CPC .............. C23C 18/168; C23C 18/1675; C23C 18/1698; C23C 18/32; C23C 18/34; C23C 18/36; G01R 33/28; H01Q 19/09
(Continued)

(56) References Cited

U.S. PATENT DOCUMENTS 5,493,702 A * 2/1996 Crowley ................ H01Q 1/241
343/702
6,195,267 B1 2/2001 MacDonald, Jr. et al.
(Continued)

OTHER PUBLICATIONS

Lu et al. , Electroplating of amorphous Ni—P alloy on fabric, 2008 [ISSN 1000-0518] (Abstract).*

(Continued)

*Primary Examiner* — Dameon E Levi
*Assistant Examiner* — Awat Salih
(74) *Attorney, Agent, or Firm* — Treyz Law Group, P.C.; Joseph F. Guihan (57) ABSTRACT

A wireless electronic device may be provided with components such as electrical and structural components. During transmission of radio-frequency signals, antennas and wireless communications circuitry of the wireless electronic device may produce associated time-varying magnetic fields. One or more components may be covered with magnetic-resistant shield structures that protect the components from the time-varying magnetic fields by preventing magnetic-induced vibrations. The magnetic-resistant shield structures may include a conductive base layer such a layer of brass. A magnetic-resistant layer may be plated onto the conductive base layer. The magnetic-resistant layer may be formed from an amorphous nickel-phosphorous alloy. The amorphous nickel-phosphorous alloy may be produced by controlling the manufacturing temperature and proportion of phosphorous in the alloy while performing the plating (Continued)

operations within a length of time that ensures non-equilibrium conditions during the plating operations.

12 Claims, 10 Drawing Sheets

(51) Int. Cl.
    *H01Q 1/24*     (2006.01)
    *H04B 15/00*     (2006.01)

(58) Field of Classification Search
    USPC ........ 361/800, 816, 818; 174/350, 377, 388,
                    174/371, 358, 386; 343/702; 148/304
    See application file for complete search history.

(56) References Cited

U.S. PATENT DOCUMENTS

| | | | | |
|---|---|---|---|---|
| 6,833,479 B2 * | 12/2004 | Witschger | ............. | C07C 217/28 205/585 |
| 6,982,378 B2 | 1/2006 | Dickson | | |
| 7,160,503 B2 * | 1/2007 | Weaver | ............. | A01L 1/00 148/420 |
| 7,280,855 B2 * | 10/2007 | Hawker | ............. | H04M 1/03 381/355 |
| 7,294,910 B2 * | 11/2007 | Thomas | ............. | B82Y 10/00 257/659 |
| 7,310,067 B1 * | 12/2007 | Zhu | ............. | H01Q 1/243 343/702 |
| 7,432,777 B2 * | 10/2008 | Kawanami | ............. | H01P 1/387 333/1.1 |
| 8,094,856 B2 * | 1/2012 | Hawker | ............. | H04R 1/028 381/355 |
| 8,272,876 B2 * | 9/2012 | Schultz | ............. | H01R 13/719 439/305 |
| 8,330,055 B2 | 12/2012 | Ueda et al. | | |
| 8,343,326 B2 * | 1/2013 | Virnig | ............. | C07C 309/10 205/94 |
| 8,422,195 B2 | 4/2013 | Stevenson | | |
| 8,440,857 B2 * | 5/2013 | Virnig | ............. | C25C 1/12 562/101 |
| 8,526,881 B2 * | 9/2013 | Lee | ............. | H05K 7/1412 455/41.2 |
| 2011/0186324 A1 | 8/2011 | Hur et al. | | |
| 2012/0242339 A1 | 9/2012 | Rey et al. | | |
| 2015/0159277 A1 * | 6/2015 | Wojcik | ............. | C23C 18/1651 427/343 |

OTHER PUBLICATIONS

Xu, A research on high-P amorphous Ni—P coating , 2002, [ISSN 1000-4742] (Abstract).*

Lu et al., Electroplating of amorphous Ni—P alloy on fabric, 2008 [ISSN 1000-0518], abstract.*

* cited by examiner

ELECTRONIC DEVICE WITH ELECTROMAGNETIC SHIELDING STRUCTURES

This application claims priority to U.S. provisional patent application No. 61/875,552 filed Sep. 9, 2013, which is hereby incorporated by reference herein in its entirety.

BACKGROUND

This relates generally to electronic devices and, more particularly, to reducing vibrations generated by components within electronic devices.

Electronic devices such as computers, cellular telephones, and other electronic devices often include printed circuits. Electronic components such as integrated circuits and other devices can be interconnected using signal traces on the printed circuits. The electronic devices may be wireless electronic devices that transmit and receive radio-frequency signals using radio-frequency circuitry. During radio-frequency transmission operations, the radio-frequency signals may be received by components that are susceptible to radio-frequency interference, which can result in improper operation of those components.

Electronic components that are susceptible to radio-frequency noise are often provided with radio-frequency shields such as shield cans. The radio-frequency shields serve as faraday cages that prevent the wireless signals from penetrating and reaching the components. Conventional shields are formed at least partially by ferromagnetic materials such as nickel and steel. Such ferromagnetic materials, while providing radio-frequency shielding, tend to exhibit magnetostrictive characteristics that can cause them to vibrate during wireless communications. Such vibrations can result in undesirable acoustic noise.

It would therefore be desirable to be able to provide improved electromagnetic shields.

SUMMARY

An electronic device may be provided with components such as electronic and structural components. The components may be soldered to printed circuit boards or support structures. The electronic device may include wireless communications circuitry and antennas that are used to transmit and receive radio-frequency signals. During transmission of radio-frequency signals, the antennas and wireless communications circuitry may produce associated time-varying magnetic fields. As an example, wireless signals produced using time-division multiplexing protocols can have signal components at audible frequencies in addition to radio frequencies. The generation of signal components at audible frequencies may also produce time-varying magnetic fields at the audible frequencies. One or more components may be covered with magnetic-resistant shield structures that protect the components from the time-varying magnetic fields by preventing magnetic-induced vibrations.

The magnetic-resistant shield structures may include a conductive base layer such a layer of brass that provides structural support for the shield structures. A conductive magnetic-resistant layer may be plated onto the conductive base layer. An additional conductive layer such as gold or tin may be plated onto the magnetic-resistant layer. The magnetic-resistant layer may serve as a diffusion barrier between the conductive base layer and the additional conductive layer.

The magnetic-resistant layer may be formed from a non-ferromagnetic material such as copper, a tin-copper alloy, a tin-copper-zinc alloy, palladium, or silver. If desired, the magnetic-resistant layer may be formed from a ferromagnetic material that is combined with a non-magnetic material to produce a magnetic-resistant material. For example, the magnetic-resistant layer may be formed from an amorphous nickel-phosphorous alloy. The amorphous nickel-phosphorous alloy may be produced by controlling the manufacturing temperature and proportion of phosphorous in the alloy while performing the plating operations within a length of time that ensures non-equilibrium conditions during the plating operations.

DETAILED DESCRIPTION

An electronic device may be provided with components such as electronic components and structural components within an electronic device housing. The electronic components may include integrated circuits, discrete components such as resistors, capacitors, and inductors, switches, and other electrical components such as sensors. The electronic components may be mounted on rigid printed circuit boards formed from materials such as fiberglass-filled epoxy and flexible printed circuits formed from sheets of polyimide or other flexible polymer layers. The structural components may include screws, brackets, springs, or other structural components. The structural components may form part of the electronic device housing or may be used to form interior housing structures of the electronic device.

The electronic device may be a wireless electronic device that includes wireless communications circuitry such as baseband circuitry, radio-frequency front-end circuitry, power amplifiers, transceiver circuitry, and transmission lines. One or more antennas may be used in transmitting and receiving wireless signals. Operation of wireless communications circuitry can produce time-varying magnetic fields in the proximity of the antennas and the wireless communications circuitry (e.g., in addition to radio-frequency signals). For example, antennas may produce time-varying magnetic fields during transmission of radio-frequency signals. These magnetic fields may affect nearby structures such as electromagnetic shielding structures, electronic components, and structural components. In other words, magnetic fields produced by wireless communications circuitry may cause the magnetic domains within the material of the components to become aligned in the direction of the applied magnetic field (i.e., to become magnetized). The level of magnetization may be proportional to the magnetic permeability of the nearby components. Component materials such as ferromagnetic materials may have relatively high permeability. For example, elemental nickel may have a relative permeability of about 100-600 (relative to free space). Materials that tend to magnetize in response to an applied magnetic field, such as ferromagnetic materials, may be characterized by magnetostrictive properties that cause vibrations in the ferromagnetic materials when subject to time-varying magnetic fields. Such vibrations can be undesirable, especially when the vibrations occur in audible frequency ranges. Structures of an electronic device that are adversely affected by magnetic-induced vibrations may be formed using magnetic-resistant materials such as non-ferromagnetic materials or by combining ferromagnetic materials with non-magnetic materials to produce magnetic-resistant materials.

Figure 1A:
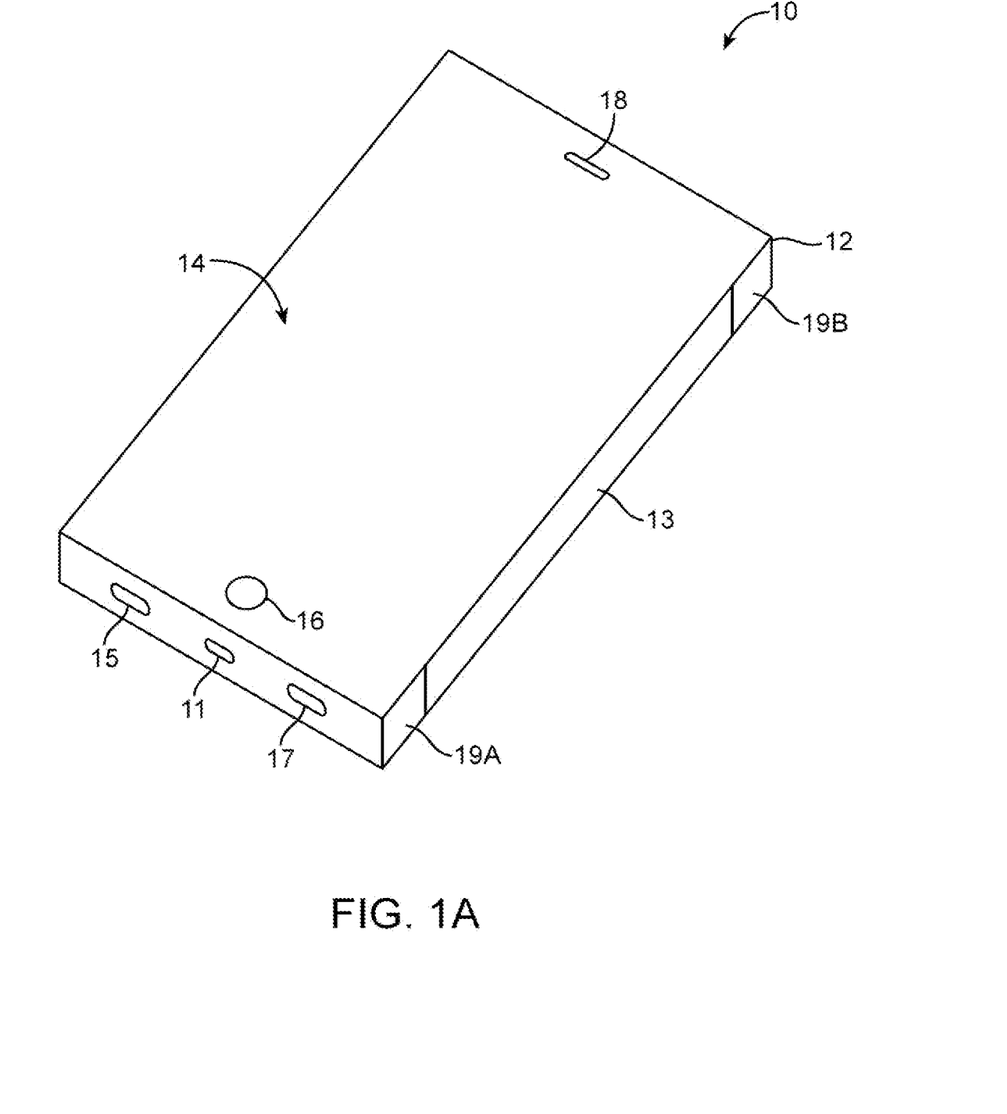
FIG. 1A is a perspective front view of an illustrative electronic device such as a handheld computing device or other electronic device having components that may be provided with magnetic-resistant shield structures in accordance with an embodiment.
Figure 1B:
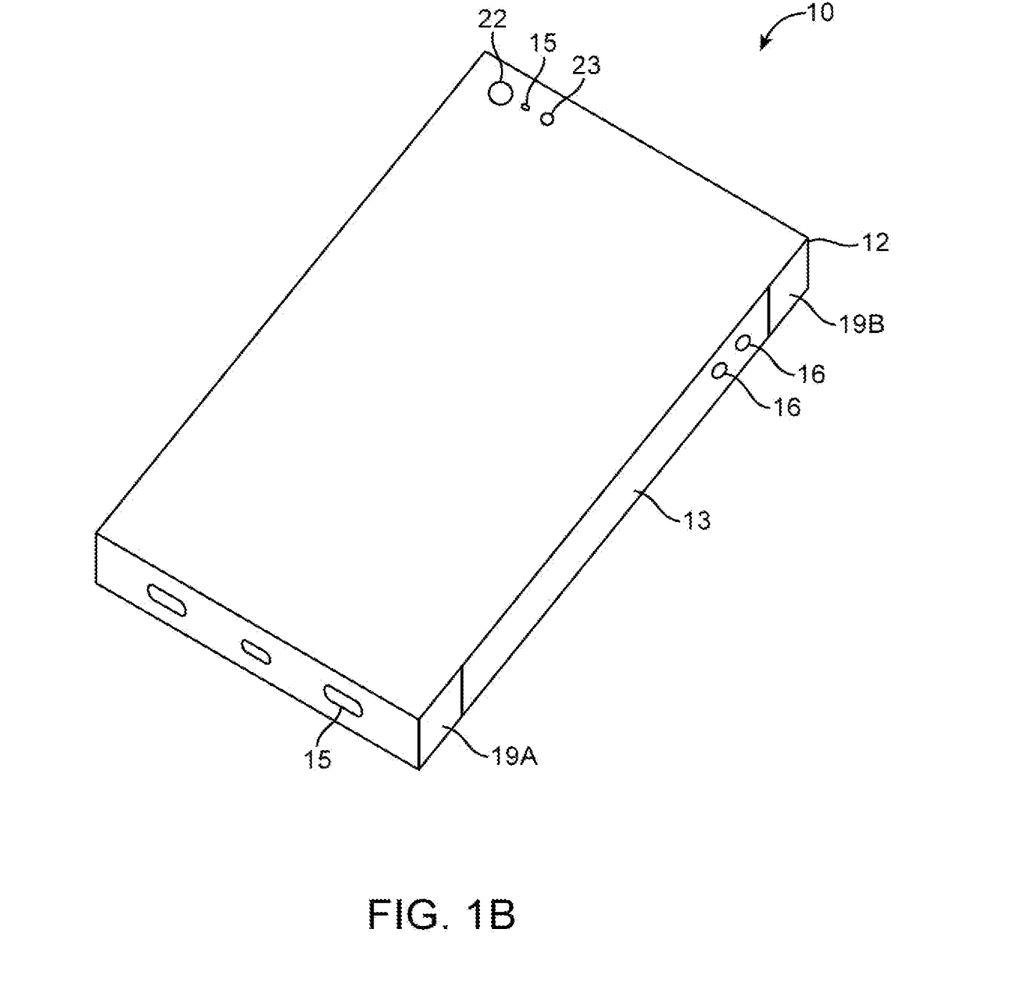
FIG. 1B is a perspective rear view of an illustrative electronic device such as a handheld computing device or other electronic device having components that may be provided with magnetic-resistant shield structures in accordance with an embodiment.

An illustrative electronic device of the type that may be provided with printed circuits having structures that are formed with magnetic-resistant materials is shown in FIGS. 1A and 1B. FIG. 1A may be a front side view of the device, whereas FIG. 1B may be a rear side view of the device. Device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment is mounted in a kiosk or automobile, a router, a set-top box, equipment that implements the functionality of two or more of these devices, or other electronic equipment. In the illustrative configuration of FIG. 1, device 10 is a portable device such as a cellular telephone, media player, tablet computer, or other portable computing device.

Device 10 may have one or more displays such as display 14 mounted in housing structures such as housing 12. Housing 12 may be formed of materials such as plastic, glass, ceramics, carbon-fiber composites and other fiber-based composites, metal (e.g., machined aluminum, stainless steel, or other metals), other materials, or a combination of these materials. If desired, openings may be formed in display 14 to accommodate components such as button 16 and speaker port 18 of FIG. 1 (as examples). Buttons, connector ports such as connector port 11, components such as microphone 15, speaker 17 and other structures may also be accommodated using openings in housing 12.

Device 10 may include antennas such as antennas 19A and 19B. In the example of FIG. 1A, antennas 19A and 19B may be formed from conductive portions of housing band 13 that surrounds device 10 (e.g., a bezel). Housing band 13 may have height that is equal to the thickness of device 10 between front and rear surfaces. Antenna 19A may be referred to herein as an upper antenna, whereas antenna 19B may be referred to herein as a lower antenna. This example is merely illustrative. Device 10 may include any desired number of antennas, including inverted-F antennas, planar inverted-F antennas, slot antennas, hybrid antennas, dipole antennas, or any desired type of antenna.

As shown in FIG. 1B, device 10 may include components such as camera 22, an additional microphone 15, and flash 23 on a rear surface. Camera 22 may be used in capturing still and/or video images, whereas flash 23 may serve to provide illumination (e.g., during image capture). Microphones 15 may be used to receive sound and may convert received sound into analog or digital electrical signals for processing. As an example, a first microphone 15 may be used to capture speech from a user during telephone calls, whereas a second microphone 15 (e.g., on the rear surface of device 10) may be used to capture ambient noise levels that are processed during noise cancellation operations. Housing band 13 may include openings for buttons 16 such as volume control buttons.

Figure 2:
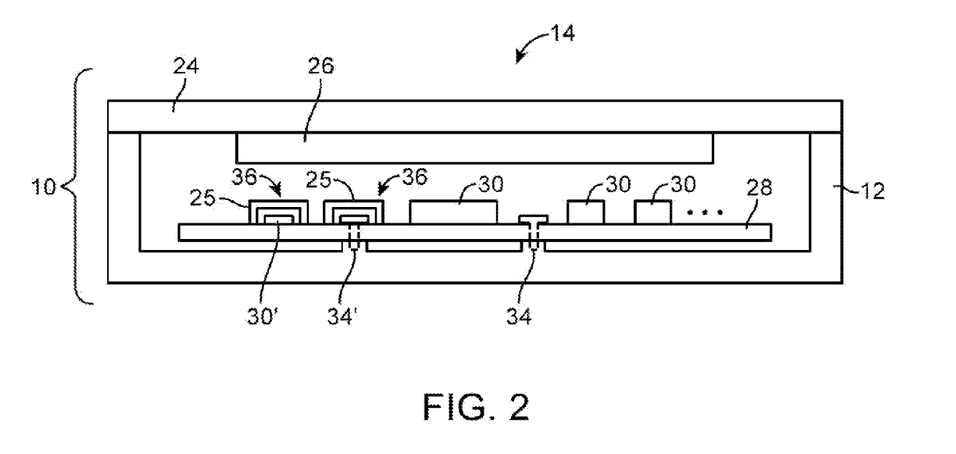
FIG. 2 is a cross-sectional side view of an illustrative electronic device having components that may be provided with magnetic-resistant shield structures in accordance with an embodiment.

FIG. 2 is an illustrative cross-sectional side view of electronic device 10 of FIG. 1. As shown in FIG. 2, display 14 may be mounted in electronic device housing 12. Display 14 may include display cover layer 24 (e.g., a sheet of clear glass or plastic) and display layers 26. Display layers 26 may be associated with a liquid crystal display and may include structures such as a thin-film transistor layer, color filter layer, a layer of liquid crystal material, polarizer layers, and backlight structures. Other types of display technology may be used in forming display 14 if desired.

One or more printed circuits such as printed circuit 28 may be used to mount and interconnect electronic components in device 10. Printed circuit 28 may be, for example, a rigid printed circuit board formed from fiberglass-filled epoxy. Flexible printed circuits formed from polyimide layers or other sheets of flexible polymer may also be used in device 10, if desired. Electrical components such as components 30 and 30' may be mounted to printed circuit board 28 using solder or conductive adhesive. Components 30 and 30' may include integrated circuits, discrete components such as resistors, capacitors, and inductors, switches, sensors, connectors, audio components, etc. For example, components 30 may be integrated circuits such as graphics chips or other video processing circuits, microcontrollers, microprocessors, memory, application-specific integrated circuits, digital signal processors, or other integrated circuits.

With one suitable layout, integrated circuit 30 has a rectangular footprint on printed circuit 28. There may be any suitable number of integrated circuits 30 on printed circuit board 28 (e.g., one or more, two or more, three or more, etc.). Device 10 may include structural components such as brackets and fasteners. Fasteners such as screws 34 and 34' may be used in attaching printed circuit 28 to housing 12. There may be one or more printed circuits 28 in device 10. For example, printed circuit 28 of FIG. 2 may be a flexible printed circuit board that is attached and electrically coupled to a main logic board on which additional integrated circuits are mounted.

Integrated circuits 30 may include wireless communications circuitry such as baseband circuitry, power amplifiers, and front-end circuitry. The wireless communications circuitry may be used to transmit and receive wireless signals such as radio-frequency signals. For example, the wireless communications circuitry may be used in transmitting and receiving cellular signals with a remote base station. During signal transmission, radio-frequency transmit signals may be generated by the wireless communications circuitry and transmitted using antennas such as antennas 19A and 19B of FIGS. 1A and 1B. During signal transmission, the wireless communications circuitry and antennas may produce time-varying electromagnetic fields associated with the transmitted signals. The electromagnetic fields may be produced in the vicinity of the wireless circuitry and can potentially magnetize nearby components of device 10 and produce undesirable vibrations. Components 30' and 34' may be components that are vulnerable to vibrations and located near wireless circuitry (e.g., and therefore may be exposed to the electromagnetic fields). For example, components 30' and 34' may be a microphone 15 and a screw that are located near lower antenna 19A as shown in FIG. 1. As another example, component 30' may be a camera 22 that is located near upper antenna 19B as shown in FIG. 2. As yet another example, screw 34' may be coupled to housing 12 and therefore vibrations at screw 34' can couple into housing 12 and potentially cause housing 12 to vibrate.

Components such as components 30' and 34' that are susceptible to vibration associated with wireless signals may be provided with shielding structures 25 that are resistant to absorption of magnetic fields and therefore do not produce vibrations in response to time-varying magnetic fields received from nearby wireless circuitry. Shielding structures 25 may be formed from conductive materials that are substantially non-ferromagnetic or may be formed by combining ferromagnetic materials with non-magnetic or magnetic-resistant materials to reduce the combined magnetism to acceptable levels. Shielding structures 25 may form component packages 36 with components that are covered by the shielding structures.

Figure 3:
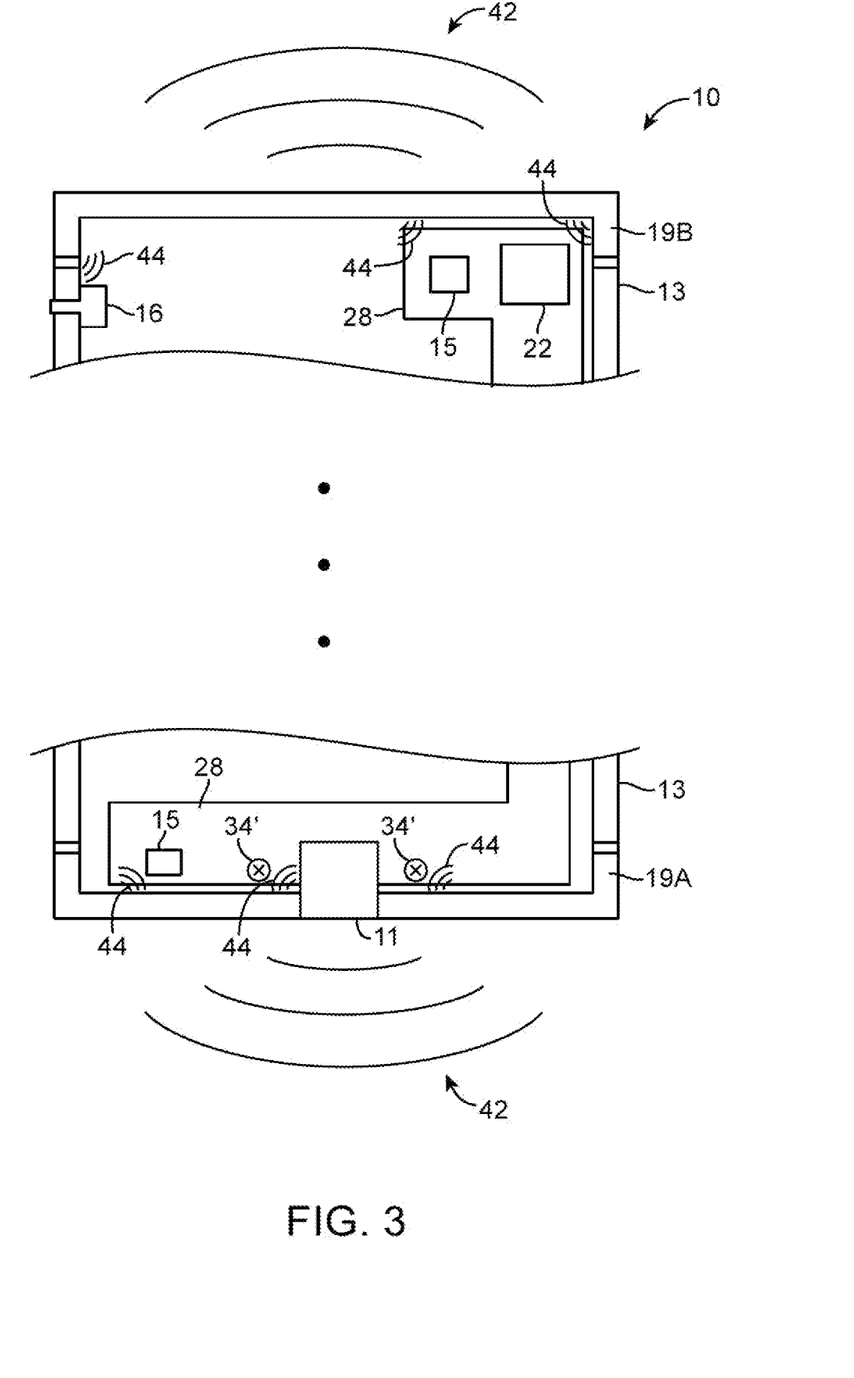
FIG. 3 is a diagram of an illustrative electronic device having components that may be provided with magnetic-resistant shield structures in accordance with an embodiment.

FIG. 3 is an illustrative front side layout diagram of portions of device 10 that may be located within close proximity of radio-frequency sources. As shown in FIG. 3, antennas 19A and 19B may produce radio-frequency signals 42 during wireless operations. Radio-frequency signals 42 may be transmitted from antennas 19A and 19B to other wireless devices such as a base station or other wireless devices. During the wireless operations, local magnetic fields 44 may be produced by antennas 19A and 19B. Local magnetic fields 44 may be time-varying and associated with transmission of radio-frequency signals 42. Time-varying magnetic fields 44 can potentially magnetize electronic and structural components within the vicinity of antennas 19A and 19B. For example, camera module 22, microphones 15, and screws 34' may be located near antennas 19A and 19B and potentially be magnetized by magnetic fields 44 and produce vibrations. As another example, button 16 that protrudes through conductive band 13 can potentially produce vibrations in response to becoming magnetized by magnetic fields 44. These components may be provided with magnetic-resistant shielding structures such as structures 25 of FIG. 2.

Figure 4:
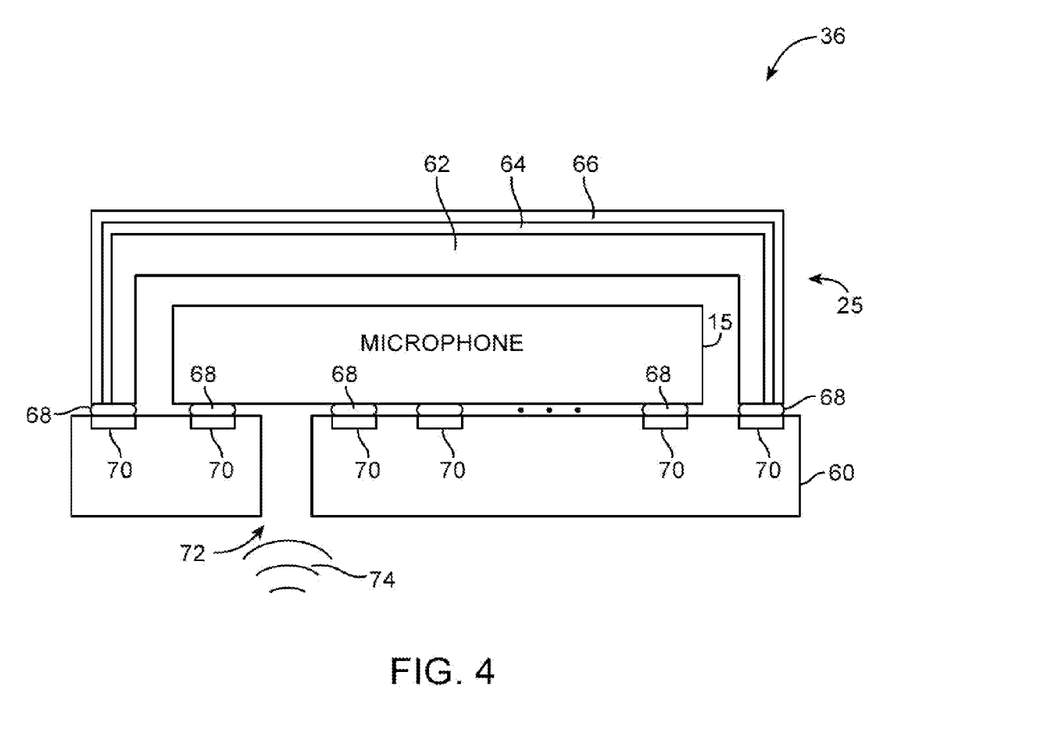
FIG. 4 is a cross-sectional side view of an illustrative component module including a microphone component that is covered with a magnetic-resistant shield structure in accordance with an embodiment.

FIG. 4 is an illustrative diagram of a component module 36 including magnetic-resistant shielding structures 25, microphone component 15, and module substrate 60. Module substrate 60 may be formed from a rigid printed circuit material such as fiberglass-filled epoxy. Microphone component 15 may be mounted to module substrate 60 via solder 68 that is coupled between conductive pads 70 on substrate 60 and component 15. Signals may be conveyed between microphone component 15 and module substrate 60 over electrical paths including solder 68 and pads 70. Module substrate 60 may include opening 72 that passes sound waves 74 to microphone 15. Microphone 15 may receive and convert sound waves 74 to electrical signals.

Magnetic-resistant shielding structure 25 may cover microphone component 15 and may be mounted to module substrate 60 via solder 68 and conductive pads 70. Shielding structure 25 may include layers 62, 64, and 66. Layers 62, 64, and 66 may be formed from magnetic-resistant materials. For example, layer 62 may be formed from a non-ferromagnetic conductive material such as brass. Layer 62 may have a thickness of about 45-60 um (e.g., 50 um) and may serve as structural support for layers 62 and 66 (e.g., layer 62 may be a rigid structure such as a shield can that surrounds and covers component 15).

Layers 64 and 66 may be deposited over layer 62 via deposition techniques such as electroless plating or other plating techniques. Layer 66 may be deposited over layer 64 and may include non-magnetic materials such as gold or tin (i.e., non-ferromagnetic materials). Layer 66 may serve as a corrosion barrier for underlying layers 64 and 62. For example, layer 66 may protect underlying layers 62 and 64 from oxidization. Layer 64 may serve as a diffusion barrier layer that helps to prevent diffusion between layers 62 and 66 (e.g., layer 64 prevents materials from layer 66 from corrupting materials at layer 62). Layer 64 may be formed from non-ferromagnetic conductive materials such as copper, tin, zinc, palladium, and silver. If desired, layer 64 may be formed from alloys of non-ferromagnetic conductive materials such as tin copper alloys or tin copper zinc alloys.

Layers 62, 64, and 66 may have varying thicknesses. As an example, layer 62 may have a thickness of 50 um, whereas layer 64 may have a thickness of 1.5 um and layer 66 may have a thickness of 1 um. This example is merely illustrative. Layers 62, 64, and 66 may have any desired thickness. For example, layer 64 may have a thickness of between 1 and 2.5 um, layer 66 may have a thickness of less than 1 um (e.g., 0.5 um), layer 66 may have a thickness of greater than 1 um, etc.

As an example, layer 66 may be a layer of tin and layer 64 may be a layer of copper. As another example, layer 66 may be a layer of gold such as a layer of gold having a thickness of 0.5 um. In this scenario, layer 64 may be a layer of palladium (e.g., having a 1 um thickness), a layer of silver (e.g., having a 1.5 um thickness), a metal alloy layer such as a tin copper alloy of 60% tin and 40% copper and having a thickness of 2 um, or a metal alloy such as a tin copper zinc alloy of 60% tin, 25% copper, and 15% zinc. These examples are merely illustrative. Any desired non-magnetic or magnetic-resistant layers 64 and 66 may be deposited on a base shielding structure such as layer 62 with any desired thickness. Optionally, one or more of layers 64 and 66 may be omitted or additional non-magnetic layers may be deposited or otherwise added to shielding structure 25.

Ferromagnetic materials may be combined with non-magnetic materials to produce magnetic-resistant materials. For example, layer 64 may be formed from an amorphous nickel phosphorous alloy. The amorphous nickel phosphorous alloy may be deposited via electroless nickel plating. In this scenario, the amorphous structure of the non-magnetic phosphorous material and ferromagnetic nickel material may provide the nickel phosphorous alloy with magnetic-resistant properties.

Shielding structure 25 serves to protect component 15 from time-varying magnetic fields, because layers 62, 64, and 66 are formed from magnetic-resistant materials that do not generate vibrations in response to the time-varying magnetic fields. Shielding structure 25 may therefore help to protect component 15 from vibrations associated with wireless communications that produce time-varying magnetic fields. In the example of FIG. 4, microphone component 15 is able to receive sound waves 74 without vibrational interference associated with wireless communications. By providing microphone component 15 with magnetic-resistant shielding structure 25, noise received by the microphone may be reduced. In particular, voice call operations may be improved, as shielding structure 25 protects microphone 15 during wireless transmission of voice signals.

Shielding structure 25 may, in addition to protecting component 15 from vibrations induced by time-varying magnetic fields, serve to shield component 15 from wirelessly transmitted radio-frequency signals. Conductive materials of magnetic-resistant layers 62, 64, and 66 may serve as a Faraday shield that blocks passage of radio-frequency signals and therefore prevents radio-frequency signals such as those transmitted by nearby antennas from reaching component 15.

The example of FIG. 4 in which shielding structure 25 covers microphone component 15 is merely illustrative. If desired, any component such as electronic or structural components that are vulnerable to magnetic-induced vibration may be protected by a shielding structure 25 that covers the component. For example, structural components such as screw 34' of FIG. 2 or electronic components such as components 30' that are located near wireless circuitry may be covered by a magnetic-resistant shielding structure 25.

Figure 5:
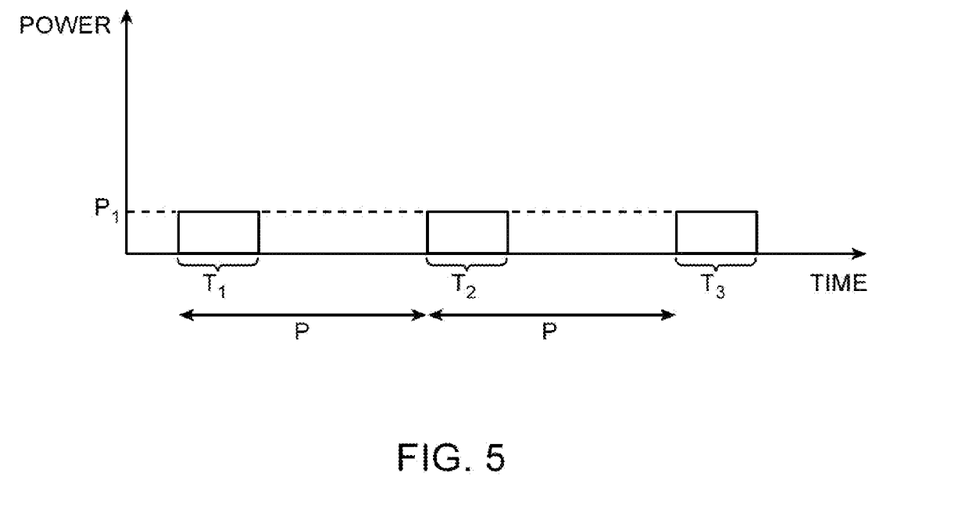
FIG. 5 is an illustrative time-domain graph showing how wireless communications using a time-division multiplexing protocol may have signal components at audible frequencies in accordance with an embodiment.

In some scenarios, the operation of wireless communications circuitry may tend to produce wireless signals having components in an audible frequency range (e.g., within a range of about 20 Hz to 20 kHz). Wireless communications using protocols such as Time Division Multiple Access (TDMA) or other protocols using time-division multiplexing may especially tend to produce wireless signals having audible components. Magnetic-resistant shielding structures such as structures 25 of FIG. 4 may be used to help prevent vibrations associated with the audible components of the wireless signals. FIG. 5 is an illustrative diagram showing how wireless communications operations performed by electronic device 10 at radio-frequencies using time division multiplexing may produce audible signal components.

As shown in FIG. 5, device 10 may produce radio-frequency signals during time periods T1, T2, and T3. The radio-frequency signals may be produced at a power level P1. Power level P1 may be a transmit power level that is sufficient to communicate with a remote base station. Device 10 may increase the transmit power level when device 10 is moved farther away from a base station to ensure that the base station receives radio-frequency transmit signals from device 10. Device 10 may reduce the transmit power level when device 10 is moved closer to the base station in order to conserve power consumption while ensuring that radio-frequency signals are transmitted at sufficient power levels to reach the base station.

During times other than time periods T1, T2, and T3, device 10 may not transmit any radio-frequency signals. Time periods such as T1, T2, and T3 in which device 10 is allowed to transmit radio-frequency signals may be determined by the time division multiplexing protocol and the base station. For example, time slots of predetermined length may be defined by the time division multiplexing protocol. In this scenario, the base station may assign time slots to wireless electronic devices. Time periods T1, T2, and T3 may be time slots that have been assigned to device 10. Time slots between time periods T1, T2, and T3 may be assigned to other devices.

During time periods T1, T2, and T3, device 10 may communicate with the base station at radio-frequencies. For example, device 10 may communicate in an 850 MHz frequency band, a 900 MHz frequency band, an 1800 MHz frequency band, or a 1900 MHz frequency band. These examples are merely illustrative. Device 10 may communicate using time division multiplexing protocols in any desired radio-frequency band.

Successive time slots that have been assigned to device 10 may be separated by time period P. For example, time period T1 may be separated from time period T2 by time P, time period T2 may be separated from time period T3 by time P, etc. Wireless communications in an assigned time period, followed by a period of inactivity, followed by communications in a successive time period, followed by another period of inactivity, and so on may form periodic pulsing of transmitted power (e.g., each pulse corresponds to an assigned time period). The wireless communications may therefore have a component at a frequency that is equal to the inverse of time P (e.g., one divided by the length of time P). The length of time P may, for example, be about 4.6 milliseconds, which corresponds to an audible frequency of about 217 Hz. This example is merely illustrative, as the length of time P may be dependent on the time multiplexing protocol and the assignment of time slots to device 10.

Figure 6:
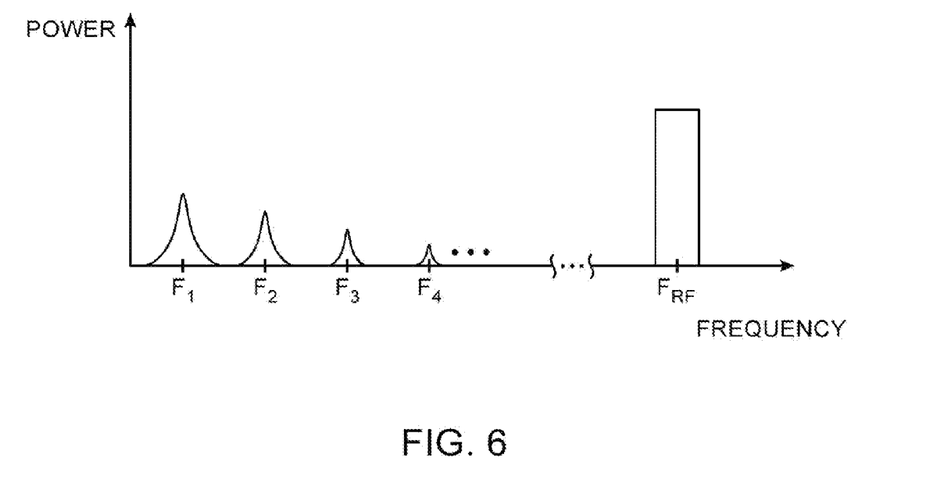
FIG. 6 is an illustrative frequency-domain graph showing how wireless communications using a time-division multiplexing protocol may have signal components at audible frequencies in accordance with an embodiment.

FIG. 6 is an illustrative graph showing how wireless communications may produce components across audible and radio frequencies by a wireless device that produces wireless signals using time division multiplexing. As shown in FIG. 6, transmit signals may be produced at radio frequencies such as within a radio frequency band centered at frequency $F_{RF}$. Transmission of wireless signals using time division multiplexing may produce time-varying magnetic fields having frequency components at audible frequencies that are lower than the radio frequencies (e.g., lower than $F_{RF}$). The time-varying magnetic fields may include a component at frequency $F_1$ that corresponds to the length of time separating successive time periods that have been assigned to device 10 (e.g., time period P of FIG. 5). Components at harmonics of frequency $F_1$ may also be produced due to non-linear operation of non-linear components such as transistors of the wireless communications circuitry.

As an example, frequency $F_1$ may be 217 Hz, frequency $F_2$ may be 434 Hz (two times frequency F1 and sometimes referred to as the second harmonic frequency of frequency $F_1$), third harmonic frequency $F_3$ may be 651 Hz, fourth harmonic frequency $F_4$ may be 868 Hz, and so on. These frequencies lie within the audible frequency range and therefore the components of time-varying magnetic fields at these frequencies can potentially produce audible vibrations. For example, local time-varying magnetic fields produced by antennas that are used in transmitting the wireless signals can potentially induce vibrations at $F_1$, $F_2$, $F_3$, and $F_4$ leading to audible acoustic noise. Magnetic-resistant structures such as structures 25 of FIG. 4 may be used to prevent such magnetic field-induced vibrations.

Figure 7:
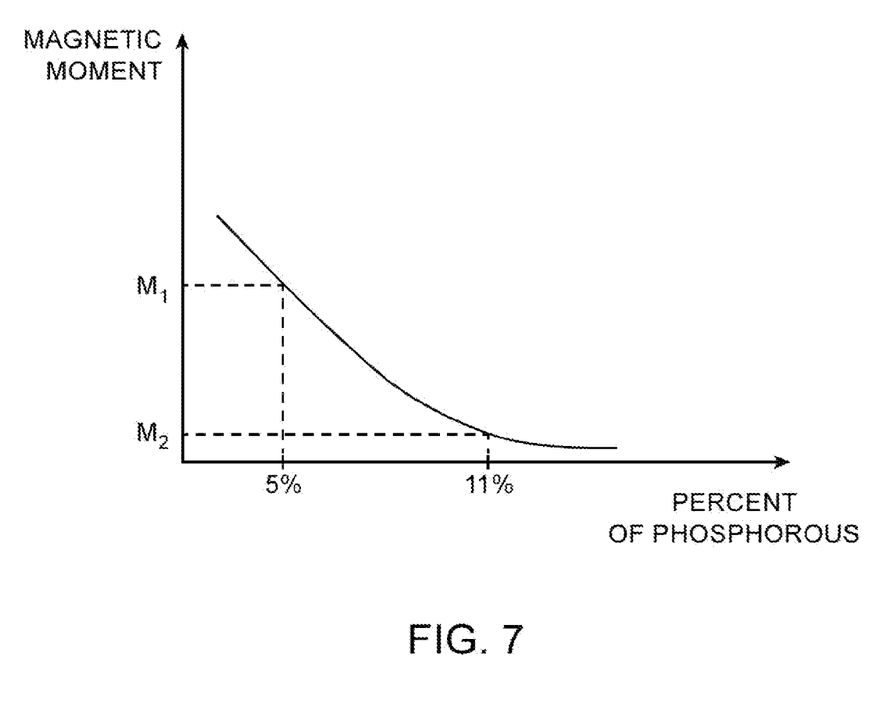
FIG. 7 is an illustrative diagram showing how the level of magnetism of a nickel-phosphorous material may be dependent on the proportion of phosphorous in accordance with an embodiment.

Magnetic-resistant materials used in layers of shield structures 25 may be formed from combinations of ferromagnetic and non-magnetic (non-ferromagnetic) materials. The proportion of non-magnetic materials relative to ferromagnetic materials may be adjusted to provide sufficient resistance to magnetism. FIG. 7 is an illustrative diagram showing how the magnetic moment of a nickel-phosphorous alloy may be determined at least partially from the percentage of phosphorous in the composition. As shown in FIG. 7, the magnetic moment of the nickel-phosphorous alloy may tend to be reduced with increasing phosphorous content. For example, the magnetic moment $M_1$ at 5% phosphorous may be about 20 electromagnetic units per gram of the alloy (emu/g), whereas the magnetic moment $M_2$ at 11% phosphorous may be less than 2.5 emu/g.

Figure 8:
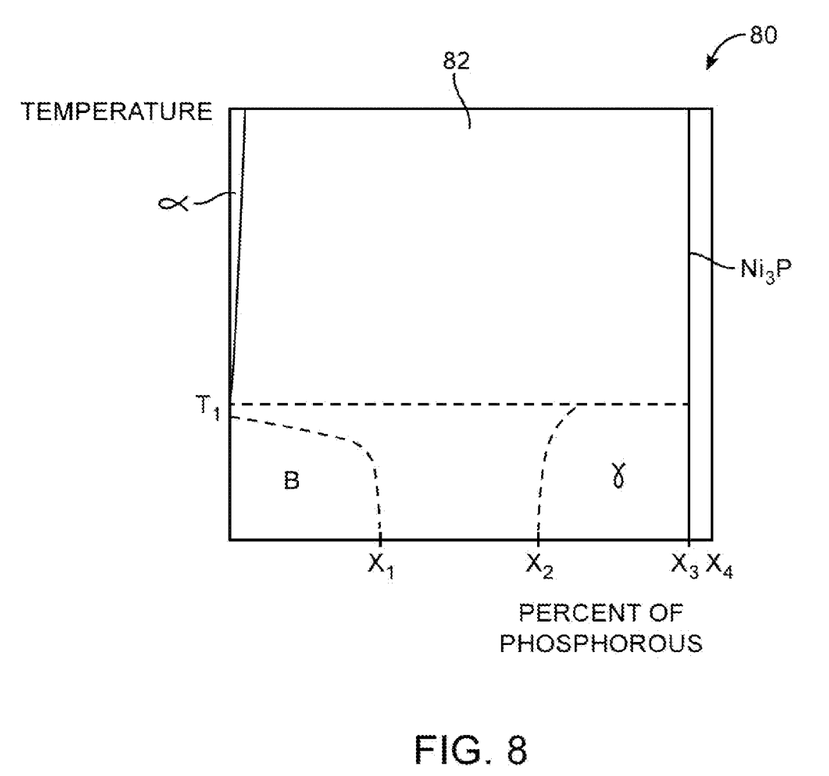
FIG. 8 is an illustrative phase diagram showing how an amorphous nickel-phosphorous alloy may be produced during plating operations by controlling the manufacturing temperature and percentage of phosphorous in accordance with an embodiment.

The level of magnetism of a nickel-phosphorous material may depend on the underlying molecular structure that is formed during fabrication (e.g., in addition to the percentage of phosphorous). FIG. 8 is an illustrative phase diagram 80 showing how a nickel-phosphorous material may be formed with different molecular structures based on temperature and phosphorous content. The phosphorous content may be represented by the percentage of phosphorous in the nickel-phosphorous alloy. Phase diagram 80 may represent the possible molecular structures for a nickel-phosphorous alloy that is manufactured during non-equilibrium conditions.

As shown in FIG. 8, the molecular structure of the nickel-phosphorous material may be formed in distinct phases. At temperatures below $T_1$ and with phosphorous content between $X_2$ and $X_3$ percent, a nickel-phosphorous alloy may be formed with an amorphous molecular structure γ (i.e., amorphous nickel phosphorous). The amorphous nickel phosphorous alloy does not have a crystalline structure and the nickel and phosphorous may be randomly arranged and resist magnetism (e.g., amorphous nickel phosphorous is a magnetic-resistant alloy). Temperature $T_1$ may be about 300° C. whereas $X_2$ may be about 11% and $X_3$ may be about 14%. At temperatures greater than $T_1$, at phosphorous content less than $X_2$, or at phosphorous content greater than $X_3$, the nickel-phosphorous material may be formed with non-amorphous molecular structures. At manufacturing temperatures below about $T_1$ and with phosphorous content below about $X_1$, the nickel-phosphorous alloy may be formed with a crystalline structure β in which the arrangement of nickel and phosphorous is highly ordered and has increased magnetism relative to the amorphous structure of γ. At manufacturing temperatures above $T_1$ and with minimal phosphorous content (e.g., less than 0.5% phosphorous), the resulting molecular structure α has magnetism levels similar to pure nickel (i.e., the nickel-phosphorous may be ferromagnetic). At phosphorous content of $X_3$, the combination of nickel and phosphorous may produce compound $Ni_3P$. $X_3$ may be about 15% (e.g., between 14-15%). For example, at phosphorous content greater than about 14% (e.g., $X_3$) and less than about 16% (e.g., $X_4$), the resulting material may include a metallic compound $Ni_3P$ that has a predetermined molecular structure and is no longer amorphous. This example is merely illustrative. Amorphous nickel-phosphorous may be produced at phosphorous content of up to $X_3$ (e.g., up to 14% or up to 15%). To help ensure that only amorphous nickel-phosphorous is produced, phosphorous content somewhat less than $X_3$ such as 11-13% phosphorous may be used.

Phase diagram 80 may include region 82 that separates the regions of α, β, γ, and $Ni_3P$. Manufacturing of nickel-phosphorous material that occurs at the temperatures and phosphorous content of region 82 may produce material formed partly of two or more different molecular structures. For example, a nickel-phosphorous alloy formed within the constraints of region 82 may be partly crystalline and partly amorphous, may partly include metallic compound $Ni_3P$, or other combinations of α, β, γ, and $Ni_3P$.

The example of FIGS. 7 and 8 illustrating how the proportion of phosphorous and the manufacturing temperature may be selected to produce an amorphous nickel-phosphorous alloy that is magnetic-resistant is merely illustrative. If desired, the manufacturing temperature and proportion of non-magnetic content of other desired alloys may be adjusted to produce an amorphous or substantially amorphous material that is magnetic-resistant.

Figure 9:
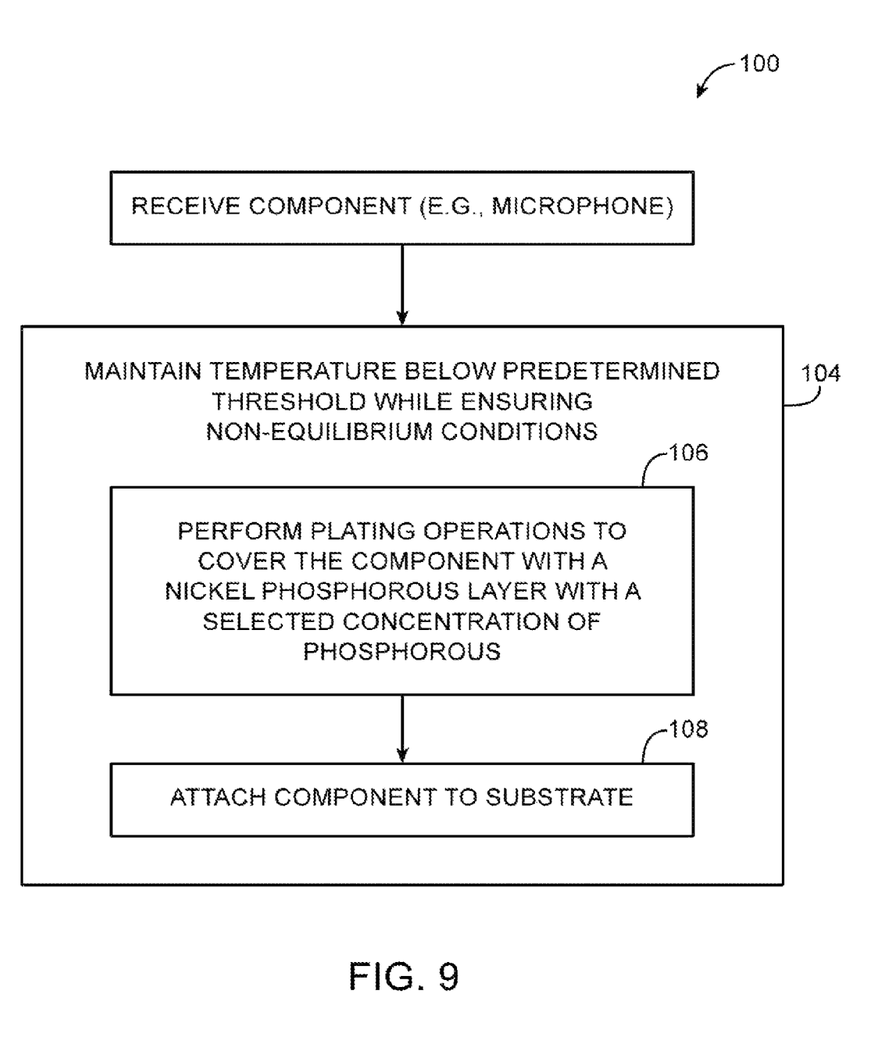
FIG. 9 is a flow chart of illustrative steps involved in forming electronic devices with magnetic-resistant shielding structures that prevent magnetic-induced vibrations associated with radio-frequency signals in accordance with an embodiment.

The phase diagram of FIG. 8 may be applicable for non-equilibrium conditions in which manufacturing times at which high levels of heat are applied are sufficiently short to prevent equilibrium during manufacturing. For example, amorphous nickel-phosphorous phase γ may not be attainable if equilibrium is reached during manufacturing (e.g., if heat during manufacturing is applied for a sufficiently long duration for the nickel-phosphorous material to reach equilibrium). In other words, there may be no region of phase γ in a phase diagram for equilibrium conditions. FIG. 9 is a flow chart 100 of illustrative steps that may be performed to ensure that an amorphous nickel-phosphorous alloy is formed during manufacturing of a magnetic-resistant shield structure for a component. The example of FIG. 9 is merely illustrative. If desired, similar steps may be performed to ensure that an amorphous alloy of any desired ferromagnetic material and non-magnetic material is formed to produce a magnetic-resistant shield structure.

During initial step 102, the component may be received (e.g., subsequent to fabrication or manufacturing of the component). The component may be a component such as components 30' and 34' of FIG. 2 that is susceptible to magnetic-induced vibrations associated with wireless communications. For example, a microphone component, a screw, a camera component, or other component may be received.

During step 104, manufacturing tools may be operated to maintain the temperature of the component below a predefined threshold while ensuring non-equilibrium conditions. The predefined temperature threshold may be selected to help ensure that the nickel-phosphorous alloy is amorphous (e.g., below temperature $T_1$ of FIG. 8). For example, the heat output of heating tools may be adjusted to control the manufacturing temperature. To ensure non-equilibrium conditions, the operations of steps 106 and 108 within step 104 may be performed within a predefined time period such as 10-30 seconds (e.g., so that the amount of heat applied to the nickel-phosphorous material during the predefined time period is not sufficient to result in equilibrium). This example is merely illustrative. In general, the time period may be minimized so that the total amount of heat applied during the time period does not result in equilibrium.

During step 106, plating operations may be performed to cover the component with a nickel phosphorous layer with a selected concentration of phosphorous. For example, the component may be placed in a nickel-phosphorous solution having the desired concentration of phosphorous. The solution may be maintained at a relatively low temperature such as between room temperature (e.g., 21° C.) and 100° C. (as an example). This example is merely illustrative. The solution may be maintained at any desired temperature for electroless plating that is below the predefined threshold. In this scenario, the nickel and phosphorous may be simultaneously deposited to cover the component (e.g., co-deposited on a base layer such as layer 62 of FIG. 4). The concentration of phosphorous may be selected to ensure that the nickel-phosphorous layer is amorphous. For example, the concentration of phosphorous may be between $X_2$ and $X_3$ of FIG. 8 such as between 11-13%, between 11-15%, etc. During subsequent heat treatment operations such as a reflow cycle, formation of non-amorphous materials (e.g., crystalline $Ni_3P$ particles, portions of crystalline nickel, crystalline nickel-phosphorous, etc.) may be prevented, because the temperature is maintained below the predefined threshold and non-equilibrium conditions are maintained.

During step 108, the component may be attached to a substrate. For example, the component may be mounted to a printed circuit board such as a flexible circuit board or printed circuit board. If desired, a component such as a screw may be attached to a housing structure or other support structure. Optionally, the order of steps 106 and 108 may be reversed. For example, a screw may be attached to mount a printed circuit board to a support structure during step 106.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   a component; and
   a magnetic-resistant shield structure that covers the component, wherein the magnetic resistant shield structure includes a conductive layer of amorphous material, wherein the conductive layer of amorphous material comprises amorphous nickel-phosphorous, wherein the magnetic-resistant shield structure comprises a base layer of brass that covers the component, wherein the conductive layer of amorphous material is interposed between the base layer of brass and a layer of gold, and wherein the conductive layer of amorphous material forms a diffusion barrier between the base layer of brass and the layer of gold.

2. The apparatus defined in claim 1 further comprising:
   a printed circuit board, wherein the component comprises an electronic component that is mounted to the printed circuit board.

3. The apparatus defined in claim 2 wherein the electronic component comprises a microphone.

4. The apparatus defined in claim 3 further comprising:
   an antenna that transmits wireless signals, wherein the magnetic-resistant shield structure prevents magnetic-induced vibrations associated with the wireless signals.

5. The apparatus defined in claim 4 further comprising:
   wireless communications circuitry that generates the wireless signals based on a time division multiplexing communications protocol in which the wireless signals are transmitted during time slots that are separated by a time period and wherein the time period is associated with an audible frequency.

6. The apparatus defined in claim 1 wherein the amorphous nickel-phosphorous is greater than eleven percent phosphorous.

7. The apparatus defined in claim 6 wherein the amorphous nickel phosphorous is less than fifteen percent phosphorous.

8. The apparatus defined in claim 7 wherein the amorphous nickel phosphorous is less than thirteen percent phosphorous.

9. The apparatus defined in claim 2 wherein the component is a screw.

10. A method of manufacturing a magnetic-resistant component module, the method comprising:
    receiving a component; and
    performing plating operations that cover the component with an amorphous nickel-phosphorous layer, wherein performing the plating operations that cover the component with the amorphous nickel-phosphorous layer comprises:
      performing the plating operations that cover the component with the amorphous nickel-phosphorous layer within a predetermined length of time that ensures non-equilibrium conditions during the plating operations.

11. The method defined in claim 10 further comprising:
    maintaining a manufacturing temperature below a predefined threshold that allows formation of the amorphous nickel-phosphorous layer during the plating operations.

12. The method defined in claim 11 wherein the amorphous nickel-phosphorous layer is between eleven and thirteen percent phosphorous and wherein the predefined threshold is 300 degrees Celsius.

* * * * *